United States Patent [19]

Bickel

[11] Patent Number: 4,989,829
[45] Date of Patent: Feb. 5, 1991

[54] PRESSURE BALANCED PROPORTIONAL FLOW CONTROL VALVE

[75] Inventor: Donald W. Bickel, Rockford, Ill.

[73] Assignee: Borg-Warner Automotive, Inc., Sterling Heights, Mich.

[21] Appl. No.: 515,797

[22] Filed: Apr. 27, 1990

[51] Int. Cl.⁵ .............................. F16K 31/06
[52] U.S. Cl. ................. 251/129.07; 251/124.08
[58] Field of Search ............... 251/129.07, 129.08

[56] References Cited

U.S. PATENT DOCUMENTS 3,606,241  9/1971  Bornholdt .................. 251/129.07 X

FOREIGN PATENT DOCUMENTS 2429205 10/1975 Fed. Rep. of
 Germany .................... 251/129.07
0090476  6/1982 Japan ........................ 251/129.08

Primary Examiner—Arnold Rosenthal
Attorney, Agent, or Firm—Reising, Ethington et al.

[57] ABSTRACT

A flow control valve (20) has a needle valve (76) for controlling flow between an inlet adapted to be connected to a source of pressure and an outlet adapted to be connected to an operating device whose operation is dependent upon the position of the needle valve; the needle valve is positioned by an armature (60) magnetically attracted by a solenoid coil (18); the armature is pressure equalized by two pins (72, 74) acting on the opposite ends (60a, 60b) of the armature and by a bypass tube (90) for supplying source pressure to each pin such that the control position of the valve is unaffected by changes in the pressure and is dependent solely upon the average current flow through the solenoid coil.

8 Claims, 2 Drawing Sheets

PRESSURE BALANCED PROPORTIONAL FLOW CONTROL VALVE

FIELD OF THE INVENTION

This invention relates to flow control valves and more particularly to flow control valves having their valving element position established by the average current flow through a solenoid coil operating on a reciprocating armature.

BACKGROUND OF THE INVENTION

U.S. Pat. Nos. 2,722,398; 3,684,238; 4,647,008; and 4,852,853 disclose pressure balanced solenoid controlled valves for controlling the flow of hydraulic fluid in hydraulic control systems for controlling a hydraulic device. The use of solenoid controlled valves requires rigorous manufacturing tolerances when the valving element is a spool. In the aforesaid arrangements the spool is replaced by a poppet valve which enables the valves to operate in contaminated environments while maintaining clearance tolerances comparable to spool type control valves.

U.S. Pat. No. 3,606,241 discloses a poppet type valve with a spindle which is coupled to the armature by a coupling spring so that valve opening will be independent of energization current to a solenoid coil.

In the aforesaid arrangements, provision for pressure balancing is accomplished by providing a direct path through the poppet valve stem. While suitable for their intended purpose, poppet type valves will not provide pressure control which varies linearly in accordance with the position of an armature within a solenoid coil.

A particularly desirable form of valve for linear pressure control is a needle valve movable concentrically within a control orifice to interact therewith to precisely control pressure for different positions of the needle within the orifice. However, such valve arrangements do not provide enough cross sectional material in the valve element or valve stem to form a pressure balancing path through the valve element and the armature to balance pressure thereacross.

SUMMARY OF THE INVENTION

The fluid control valve of the present invention is characterized as having a solenoid coil selectively energized to position an armature for moving a needle valve element to a position which is set in accordance with the average current flow through the solenoid coil and wherein the armature is pressure balanced by two spaced pins each having pressure directed thereagainst such that the armature's position is maintained independent of system pressure and solely in accordance with the average current flow through the solenoid coil.

One feature of the present invention is to provide a solenoid actuated needle valve for regulating the outlet pressure from the valve and to include an armature within the valve housing which reciprocates therein and has one end connected to a first pin having a needle surface on one end for controlling pressure across an orifice and wherein a second pin is provided on the opposite end of the armature and wherein a bypass tube supplies source pressure to the pins to pressure balance the armature such that the control position of the needle surface within the orifice is established solely by current flow through the solenoid coil.

A further feature of the present invention is to provide a solenoid actuated, needle type metering valve in which the valve position is provided by a linear solenoid responding in an analog fashion to a high frequency, pulse width modulated current signal on the solenoid coil and wherein the armature is pressure balanced by two pins so that the valve position is a function only of the average value of such current signal to the coil.

A further feature is to provide for such pressure balancing of the armature by locating an internal tube within the valve housing to direct pressure to pins acting on either end of the armature to pressure balance the armature regardless of the system pressure and regardless of the control set point of the solenoid actuated metering valve.

A further aspect of the present invention is to provide a speed sensitive steering control valve in which a valve is provided to receive pressure from the power steering pump for flow to a reaction chamber in the steering gear to vary steering effort in accordance with vehicle operating conditions. The speed sensitive steering control valve includes a linear solenoid controlled armature for positioning a needle element in an orifice to control the regulated pressure in accordance with a desired function and solely in response to an average current flow to the solenoid; two pins are provided with the same area to act on the armature to balance pressure forces such that a small solenoid can be used to control the needle element position regardless of hydraulic supply pressure.

An object of the present invention is to reduce the size of solenoid coils required to operate a flow control valve regulating the pressure at a device associated therewith, the flow control valve has a housing supporting an armature for movement therein and includes a pressure inlet port adapted to be connected to a high pressure source and an outlet port adapted to be connected to a device whose operation is controlled in accordance with the output pressure of the flow control valve; a solenoid coil positions an armature within the valve housing and a needle valve held in contact with said armature due to force from hydraulic pressure has a valve pin that produces a source pressure reaction on the armature during regulation of the output pressure from the valve in accordance with the energization level of said solenoid coil the flow control valve characterized by: spring means for biasing the armature in a first predetermined direction to either maintain the needle valve in a normally open position or a normally closed position; and the armature having a valve stem reaction surface and pressure balancing reaction surface for balancing the source pressure reaction thereon from the needle valve during its regulation of the pressure at the valve outlet; the flow control valve further having a pressure balance bypass around the armature for pressure balancing the armature so as to control the position of the needle valve solely in response to the average current flow to the solenoid coil and for maintaining the adjusted position of the needle valve as set by the average current flow regardless of changes in the source pressure.

A further object of the invention is to provide the control valve of the preceding paragraph characterized by a balance pin for compensating for variances in the hydraulic source pressure acting on the armature by directing a compensation force on the pressure balancing reaction surface of the armature.

A further object of the invention is to provide a control valve of the preceding objects further characterized by a bypass tube fixedly mounted in the valve housing for bypassing source pressure around an armature mounted for reciprocation in a low pressure chamber of the valve housing and further characterized by a closure on the valve housing with an opening to receive pressure from the bypass tube for directing compensating pressure on the balance pin thence to the pressure balancing reaction surface of the armature.

Yet another object of the present invention is to provide a control valve of the preceding objects wherein the closure has the balance pin slidably supported therein for reciprocation with respect to the valve housing; the balance pin having an area on which the pressure from the bypass tube is imposed which is equal to the area on a needle valve pin against which the source pressure of the valve is directed during the operation of the valve.

These and other features, objects and advantages of the invention will become more apparent with reference to the following description of a preferred embodiment of the invention taken in conjunction with the accompanying drawings wherein:

DETAILED DESCRIPTION OF THE DRAWINGS

DETAILED DESCRIPTION OF A PREFERRED EMBODIMENT

Figure 1:
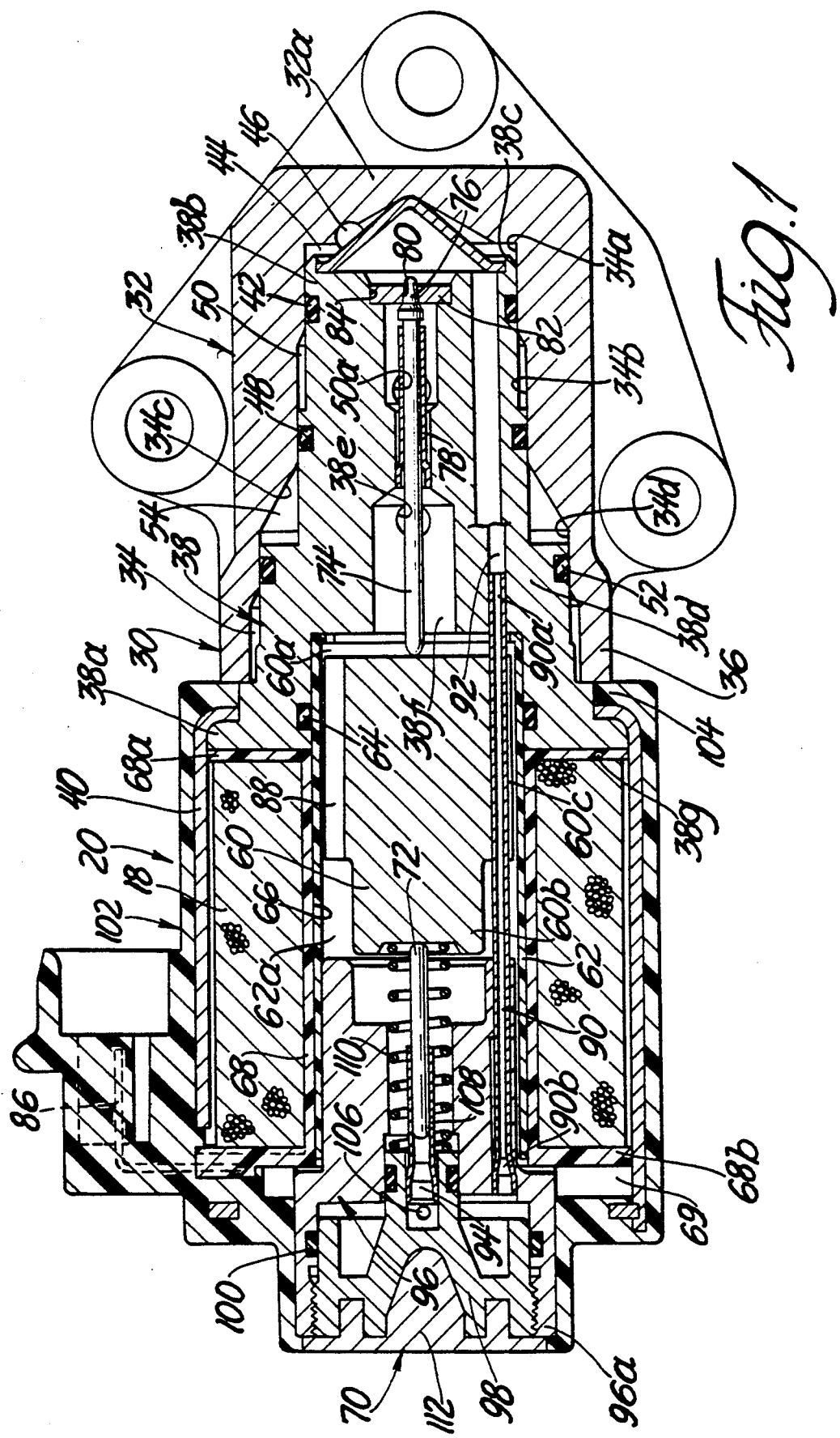
FIG. 1 is a diagrammatic view of a power steering system including the control valve of the present invention.

Referring now to FIG. 1, a control system 10 is illustrated having an engine control module 12 for supplying suitable signals of operating conditions to an electronic controller 14. The controller 14 directs a pulse width modulated output signal on electrical conductor 16 for energizing the coil 18 of a solenoid operated valve 20 including the present invention.

The solenoid operated valve 20 is connected by hydraulic conduits 20a, 20b and 20c to a power steering system 22 which includes a rotary control valve 24 of a known type for controlling the flow of fluid from a power steering pump 26 to control the steering force required to actuate steering gear 28

In accordance with one aspect of the present invention the solenoid operated valve 20 is operated in accordance with the level of the average current directed through electrical conductor 16 by the electronic controller 14 to condition the rotary control valve 24 to vary the force of the steering effort in accordance with an engine operating condition. While the solenoid operated valve 20 is shown in association with a power steering system it should be recognized that it is suitable for association with any hydraulic system which requires precise control across a flow orifice by a needle valve operable to control hydraulic flow across an orifice solely in accordance with the average current flow across a solenoid coil positioning an armature (and the needle valve connected thereto) in a constant manner regardless of changes in the system pressure.

Figure 2:
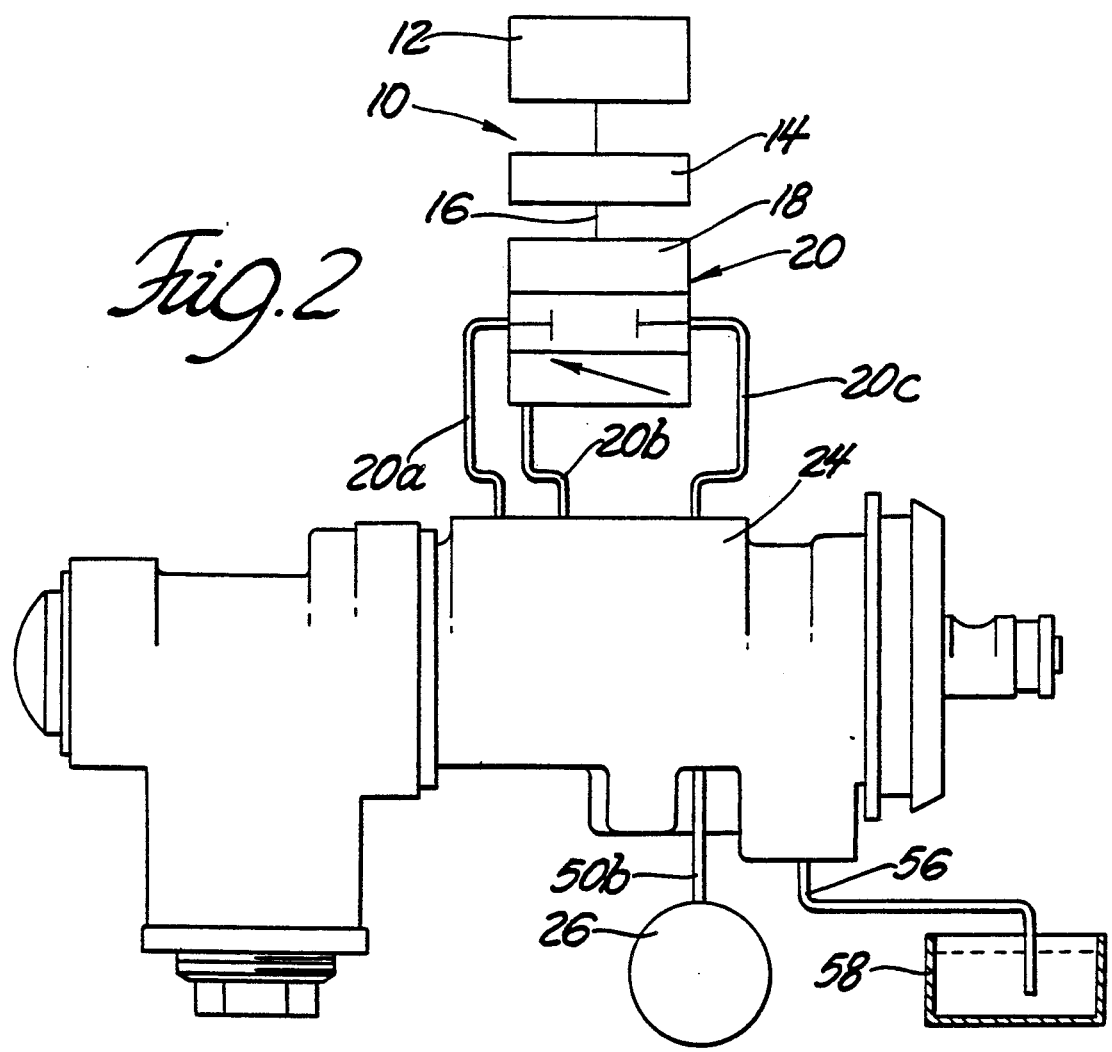
FIG. 2 is an enlarged longitudinal sectional view of the control valve shown in FIG. 1.

Referring now more specifically to FIG. 2, the solenoid operated valve 20 has a valve housing 30. The valve housing 30 includes a cylindrical member 32 with a stepped bore 34 formed therein including a closed small diameter portion 34a, a slightly larger diameter inlet portion 34b and a bore segment 34c which is of the same diameter as the bore 34b at the inboard end thereof and which has an outer diameter equal to a sealing segment 34d of the stepped bore 34, all as shown in FIG. 2. The cylindrical member 32 includes an open end 36 thereon into which is inserted a valve carrier member 38. The valve carrier member has a large diameter head portion 38a located outboard of the cylindrical member 32 which supportingly receives a housing 40 for the coil 18 of the solenoid operated valve 20.

In accordance with certain principles of the present invention, the valve carrier member 38 additionally includes a small diameter inboard portion 38b that carries an annular seal 42 that sealingly engages with the bore segment 34a to form a pressure control chamber 44 between the inboard end 38c of the carrier member 38 and the end wall 32a of the cylindrical member 32.

The pressure chamber 44 communicates with a valve inlet port 46 that is connected by the conduit 20c to a supply pressure source.

Additionally, the valve carrier member 38 includes a second larger diameter sealing ring 48 that is in sealing engagement with the bore segment 34b to define an annular chamber 50 adapted to be connected to a valve outlet opening 50a. The valve outlet opening 50a is communicated by a conduit 20b to a reaction chamber in the steering gear 24 in the control system 10 shown in FIG. 1.

Another sealing O-ring 52 is supported by an outboard end 38d of the valve carrier member 38 to sealingly engage the bore segment 34d to define an annular chamber 54 which communicates with the return conduit 20b back to a hydraulic sump 58. The annular chamber 54 is communicated by an opening 38e with a chamber 38f centrally located within the outboard end 38d of the valve carrier member 38. The chamber 38f supplies low pressure in the control system to opposite ends 60a, 60b of an armature 60 that is slidably located within an electrical insulating sleeve 62 defining a low pressure chamber 62a. The sleeve 62 is sealed at one end thereof by an O-ring 64 supported on the open end 38a of the valve carrier member 38 and the outside surface of the sleeve 62. The insulating sleeve 62 is concentrically located within a bore 66 formed through a coil support member 68 having an annular flange 68a on one end thereof that abuts against the outermost end 38g of the valve carrier member 38 and which has a second flange 68b axially spaced from the first flange 68a to abut against a spacer member 69. The spacer member 69 is located to provide a support for a high pressure balance assembly 70 constructed in accordance with certain principles of the present invention to supply pressure from the chamber 44 to a pin 72 to pressure compensate the armature 60 as will be described.

The armature 60 is also in engagement with a second pin 74 that has a tapered needle valve element 76 connected to the opposite end thereof. The pin 74 is slidably supported within the carrier member 38 by a sleeve 78 and is positioned by the armature 60 to locate the tapered outer surface of the needle valve element 76 in spaced relationship to an orifice 80 formed in an orifice plate 82. The orifice plate 82 is seated within a bore 84 at the end of the valve carrier member 38.

In operation, power supplied through a terminal 86 supplies the pulse width modulated current to the coil 18. Depending upon the average value of the current flow through the coil 18 (which is grounded by a second terminal, not shown), the magnetic attraction of the armature 60 will be varied to establish the area of the annular opening between the needle valve element 76 and the orifice plate 82. The area establishes the rate of flow through the solenoid operated valve 20 and the pressure level to be applied to the operating device so as to vary the operation thereof in accordance with the position of the armature 60.

In order to maintain a constant valve position, it is necessary to balance the system pressure across the armature so that its position will be reliant solely upon the average current value of the control signal applied across the coil 18. In accordance with certain principles of the present invention, the return pressure in the system is across the ends 60a, 60b of the armature 60 by the provision of a cross passage 88 in the armature 60 which receives pressure from the chamber 38f and directs it to the opposite end 60b of the armature 60 as shown in FIG. 2.

The source pressure of the valve acting on the pin 74 is applied against the armature end 60a to produce a pressure reaction on the surface 60a during valve operation. In order to pressure balance the armature against such pressure, in accordance with other principles of the present invention, a bypass tube 90 is provided internally of the valve 20. The bypass tube 90 has an inlet end 90a thereon fit within a bore 92 formed through valve carrier member 38. The bore 92 is in direct communication with the chamber 44 for directing the pressure therein through the bypass tube 90 to the opposite end 90b. The opposite end 90b is sealed within a bore 94 directed through a closure member 96 of the high pressure balance assembly 70. The closure member 96 has a threaded cover plate 98 supported in one end thereof and sealed by an O-ring 100 supported within an open end 96a of the closure member 96. The cover plate 98 is threadably engaged with closure member 96. The end of the high pressure balance assembly 70 and the coil housing 40 are surrounded by an encapsulation (plastic) housing 102 with a lock encapsulation flange 104 engaged with the large diameter head portion 38a. The housing 102 thus encapsulates the high pressure balance assembly 70 and the solenoid coil 18 on the valve housing 30.

The high pressure closure assembly 70 has a cross passage 106 that supplies balancing pressure from the chamber 44 to one end of a tubular sleeve 108. Tubular sleeve 108 supportingly receives the second pin 72 for reciprocation relative thereto. The second pin 72 is biased by the pressure in the cross passage 106 to direct a balance force on the inboard end 60b of the armature 60 defining a balancing pressure reaction surface thereon. A coil spring 110 is supported between the cover plate 98 and inboard end 60a of the armature 60. The coil spring 110 forces the armature 60 and the pin 74 in a direction so that the tapered sleeve valve element 84 will be maintained normally closed prior to energization of the coil 18. The cover plate 98 is threadably adjusted against spring 110 to calibrate the unit. Potting 112 closes the end of cover plate 98 when the unit is calibrated for corrosion protection.

Figure 3:
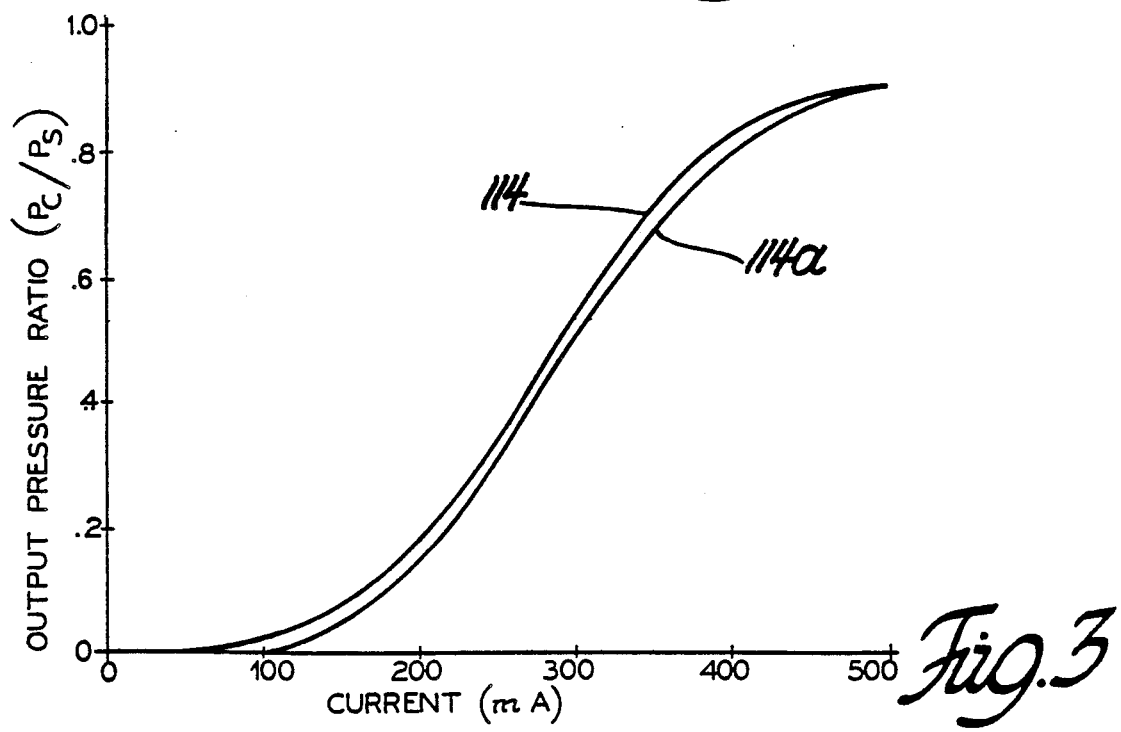
FIG. 3 is a chart showing the output pressure ratio for different average current flows to the solenoid of the control valve in FIG. 2.

In normal operation, the output pressure ratio from the solenoid operated control valve 20 is shown in the chart of FIG. 3. The chart shows the output pressure ratio across the orifice for various levels of average current flow across the solenoid coil 18. The curve 114a represents the pressure ratio for the initial energization of the coil and the curve 114 shows the pressure ratio produced for a decaying current across the coil 18. In each case, the resultant pressure ratio is substantially linear between average current values of 200 to 400 MA.

The control signal is directed from the electronic controller 14 in accordance with the signal from the engine control module 12. The pressure from the power steering pump 26 is directed into the chamber 44 and the armature 60 is positioned such that the pin 74 will be moved in a direction to cause the needle valve 76 to open with respect to the orifice plate 82. Pressure is modulated across the orifice 80 to control the pressure level in the chamber 50. The control pressure is directed through opening 50a for application to a chamber in a device such as a rotary control valve of a power steering unit to control the amount of force required to operate the steering gear 28. The return pressure in the system is directed through the opening 38e and is balanced across the armature 60 by passage through the balance pressure port 88 in the armature 60. Thus, the armature 60 is balanced by low pressure thereacross. The higher pressure in the system is balanced thereacross by being directed on the pin 74 which has an area of contact with the balancing pressure equal to the pressurized area of the pin 72. The pressure from the chamber 44 acts on the tapered surface of the valving element 76 to direct a modulated pressure force on the end 60a. At the same time, the bypass tube 90 will carry the same pressure to the pin 72 that will apply a balancing pressure on the opposite end 60b of the armature 60. In accordance with certain principles of the present invention, the bypass tube 90 is located within an axial opening 60c through the armature 60 so that the armature 60 is free to slide on the bypass tube 90 during attraction of the armature 60 with respect to the coil 18 in accordance with the pulse with modulated current signal applied thereacross by the electronic controller 14.

While the control valve 20 of the present invention is representatively shown as a control valve which is arranged to proportionally control flow from a source such as a power steering pump to a device such as a rotary control valve for controlling the position of a steering gear, the solenoid control valve is equally suitable for use with other systems which require the precise regulation of a pressure in a hydraulic device. In either case, the valve is characterized by a two-pin pressure balancing arrangement having equal areas, or the equivalent of equal areas, to produce a reaction pressure on opposite ends of the armature 60 of the solenoid valve to produce a metering valve position that is solely dependent upon the energization of a linear solenoid coil in an analog fashion as a high frequency pulse width modulated signal is applied thereto. Accordingly, the resultant position of a needle valve 84 will be a function of the average current flow to the coil only and will remain constant regardless of the system pressure either in the chamber 44 or in the return chamber 54.

What is claimed:

1. A pressure control valve having a valve housing (30) supporting an armature (60) for movement therein and including a pressure inlet port (46) adapted to be connected to a high pressure source defining a system pressure (26) and including an outlet port (50a) adapted to be connected to a device (24) whose operation is controlled in accordance with the output pressure of the valve, a solenoid coil (18) for positioning the armature relative to the valve housing and a needle valve (76) having a valve pin (74) producing a back pressure force on the armature during regulation of the output pressure from the valve in accordance with the energization level of said solenoid coil characterized by:

spring means (110) for biasing said armature in a first predetermined direction to either maintain said needle valve in a normally open position or a normally closed position;

said armature having an outlet pressure reaction surface (60a) and pressure balancing reaction surface (60b), said back pressure force of said needle valve pin acting on said outlet pressure reaction surface during regulation of the pressure at said outlet port; and pressure balance means (70) for controlling the position of said needle valve solely in response to the average current flow to said solenoid coil and for maintaining the adjusted position of said needle valve as set by said average current regardless of changes in the system pressure.

2. The pressure control valve of claim 1, further characterized by said pressure balance means including means (72, 90) for directing a compensation force on said pressure balancing reaction surface of said armature.

3. The pressure control valve of claim 1, further characterized by said pressure balance means for compensating for variances in the hydraulic source pressure acting on said needle valve including an internal flow path (90) fixedly formed with respect to said valve housing for directing pressure from the inlet (46) of the valve to the pressure balancing reaction surface of said armature.

4. The pressure control valve of claim 1, further characterized by said valve housing associated with a low pressure chamber (62a), said armature slidably reciprocated in said low pressure chamber; a tube (90) mounted in said valve housing for bypassing said armature and closure means (96, 98) on said valve housing having means (72, 108) therein to receive pressure from said tube for directing compensating pressure on the pressure balancing reaction surface of said armature.

5. The pressure control valve of claim 4, further characterized by said closure means including a pin (72) slidably supported for reciprocation with respect to said valve housing; said pin having an area for receiving pressure from said tube which area is equal to the area on said needle valve against which the outlet pressure of the valve is directed during the operation of the valve.

6. A pressure control valve having a valve housing (30) supporting an armature (60) for movement therein and including a pressure inlet port (46) adapted to be connected to a high pressure source (26) and including an outlet port (50a) adapted to be connected to a device (24) whose operation is controlled in accordance with the output pressure of the pressure control valve, a solenoid coil (18) for positioning the armature within the valve housing and a needle valve (76) mechanically coupled to said armature and having a valve pin (74) for producing the back pressure reaction on the armature during regulation of the output pressure from the valve in accordance with the energization level of said solenoid coil characterized by:

means including a first opening (88) through said armature for balancing the return pressure of the valve on opposite ends of said armature; and means including a second axial opening (60c) through said armature and a bypass tube (90) located in said second axial opening and fixed with respect to said valve housing as said armature is moved relative to said valve housing for balancing the source pressure of the valve on opposite ends of said armature as said armature is positioned relative to said valve housing by said solenoid coil.

7. The pressure control valve of claim 6, further characterized by said valve housing associated with a low pressure chamber (62a) for supporting said armature for reciprocation relative to said valve housing, said bypass tube directed through said low pressure chamber for bypassing said armature as it is reciprocated within said low pressure chamber and closure means (96, 98) on said valve housing having means (72, 108) therein to receive pressure from said bypass tube for directing compensating pressure on the pressure balancing reaction surface of said armature.

8. The pressure control valve of claim 7, further characterized by said closure means including a pin (72) slidably supported for reciprocation with respect to said valve housing and having one end bearing against said armature and another end thereof directly exposed to pressure within said bypass tube; said pin having an area on which the pressure from said bypass tube is imposed which is equal to the area on said needle valve against which the source pressure of the valve is directed during the operation of the valve.

* * * * *